United States Patent [19]

Bendikson

[11] Patent Number: 4,602,484
[45] Date of Patent: Jul. 29, 1986

[54] REFRIGERATION SYSTEM ENERGY CONTROLLER

[76] Inventor: Donald L. Bendikson, P.O. Box 2817, Palos Verdes Peninsula, Calif. 90274

[21] Appl. No.: 601,773

[22] PCT Filed: Jul. 22, 1982

[86] PCT No.: PCT/US82/01010
§ 371 Date: Mar. 7, 1984
§ 102(e) Date: Mar. 7, 1984

[87] PCT Pub. No.: WO84/00603
PCT Pub. Date: Feb. 16, 1984

[51] Int. Cl.[4] ............................................. G05D 23/32
[52] U.S. Cl. ..................... 62/158; 62/228.3; 361/22
[58] Field of Search ................ 62/158, 228.3; 361/22

[56] References Cited

U.S. PATENT DOCUMENTS

| | | | |
|---|---|---|---|
| 3,636,369 | 1/1972 | Harter | 307/141.4 |
| 3,864,611 | 2/1975 | Chang | 318/484 |
| 4,094,166 | 6/1978 | Jerles | 62/158 |
| 4,142,375 | 3/1979 | Abe et al. | 62/158 |
| 4,292,813 | 10/1981 | Paddock | 62/158 |

Primary Examiner—William E. Wayner

[57] ABSTRACT

A refrigeration system energy controller 10 for controlling the on-Off cycle time of a refrigeration compressor motor 25. A pressure-sensing device 27 senses high and low pressure thresholds in the refrigeration low-side suction line, the high threshold event being converted to a first digital voltage that energizes the refrigeration compressor motor 25, and the low threshold event being converted to a second digital voltage that produces a fixed duration timing signal setting the minimum time duration of the compressor motor 25 on-Off cycle.

9 Claims, 4 Drawing Figures

REFRIGERATION SYSTEM ENERGY CONTROLLER

TECHNICAL FIELD

The invention pertains to refrigeration system energy controllers and especially to refrigeration system controllers that sense pressure and/or temperature in the refrigerant line and control the on-off cycle of the refrigeration compressor motor thus, providing a minimal use of electrical energy while maintaining desired refrigeration under varied ambient temperature and humidity conditions in the vicinity of the refrigeration unit.

BACKGROUND ART

It is well known in the art of refrigeration control systems to use a pressure control switch which responds to pressure conditions in the suction line between the evaporator and compressor. The purpose of this device is to act as a safety control to prevent the suction pressure from falling to a point where the compression ratio will be too great for the compressor design. It also prevents the suction pressure from falling to a point where other damage can occur from low temperature. This type of controller normally has an adjustable range or differential and serves to turn off the compressor at the lower end of the range (cut-out) when pressure (and therefore temperature) conditions have been satisfied. At the upper end of the range (cut-in), the compressor is turned on again. The average pressure (and temperature) of the suction line is therefore maintained at the average of cut-in and cut-out levels of the pressure control switch.

It should be noted that a temperature control switch such as a thermostat placed in the refrigeration compartment containing the evaporator will perform a similar function to that of the pressure control switch. The temperature control switch will normally have a temperature sensing means, and have cut-in and cut-out settings similar to that of the pressure control switch.

Since many refrigeration systems are required to maintain operation over a wide range of temperature conditions, the pressure control switch is subject to certain seasonal problems. During winter periods, compartment cooling may be required even though the outdoor temperature is quite low. Under such conditions, the condenser may condense refrigerant so effectively that the compressor is unable to maintain a satisfactory hot gas pressure for delivering sufficient refrigerant across the restriction between the high and low sides of the system. As a result, the evaporator may be semi-starved of refrigerant, especially at start-up. At start-up, the compressor may draw more refrigerant from the evaporator than can be replaced by the condenser, thus causing the suction line pressure to suddenly drop, thereby actuating the low pressure cut-out. The result is a short on-off-on cycling of the compressor which can place excessive strain and loading on the compressor motor.

In the warm summer months where energy conservation is extremely important, high ambient temperatures generally cause the compressor to run for very long periods followed by very brief off periods.

In most cases, it is desirable not to have to adjust the pressure (or temperature) limits and range of the pressure control switch seasonally. For example, ambient temperature conditions can at times change very rapidly, necessitating a high degree of alertness and maintenance care, if the refrigeration control system is not adaptible to these changing conditions.

To surmount these problems posed by changing temperature conditions in the vicinity of the refrigeration system, various modifications and improvements have been introduced to the art.

To avoid the short-cycling problem, the pressure control switch differential between cut-in and cut-out has often been increased. This, however, causes much longer on-off cycles than desired, especially under high ambient conditions where energy conservation is of prime importance.

In order to arrive at a satisfactory compromise to the problem of short-cycling and excessive compressor run-time, various refrigeration control devices have included a fixed compressor off-time delay implemented by either electro-mechanical or solid-state devices. This off-time delay serves to allow sufficient pressure (and temperature) to build up in the suction line between evaporator and compressor, and thus prevents short-cycling. The disadvantage to the fixed off-time delay control is that no upper pressure limit is sensed prior to turning on the compressor. The average temperature of the refrigeration unit is thus allowed to vary excessively at the expense of providing short-cycle prevention.

U.S. Pat. No. 4,292,813 attempted to surmount this problem posed by the fixed time delay by adjusting the off-time delay in inverse manner to the latest recorded compressor run-time. That is, if the last compressor run-time was lower than some minimum desired time, the off-time was increased. Similarly, if instead, the run-time was recorded to be greater than some maximum desired time, the off-time delay was increased. The object of changing the off-time delay in this manner was to force the next compressor run-time to track the off-time, thus maintaining a fairly constant duty cycle. This adaptation does tend to compensate for the extreme ambient temperature operating conditions of the refrigeration system, but like other off-time delay methods, it does not start the compressor motor at a fixed upper pressure (and temperature). The average refrigerator temperature, therefore, is not controlled as closely as may be necessary.

The prior art searched did not disclose any patents or publications that were directly related to a refrigeration system energy controller of the type disclosed herein. However, the following U.S. patents were considered in the investigation and evaluation of the prior art relative to the existing apparatus used with the invention:

| U.S. PAT. NO. | INVENTOR | ISSUED |
| --- | --- | --- |
| 4,292,813 | Paddock | 6 October 1981 |
| 4,142,375 | Abe, et al | 6 March 1979 |
| 4,094,166 | Jerles | 13 June 1978 |
| 3,864,611 | Chang | 4 February 1975 |
| 3,636,369 | Harter | 18 January 1972 |

The Paddock patent describes an adaptable off-time delay associated with an ambient temperature thermistor sensor used to sense where the compressor should be turned on. Abe, et al, describe a fixed off-time delay associated with an auxiliary fan for cooling of evaporator coils during compressor off-time. The Jerles patent describes fixed on and off-time delays for compressor operation. The Chang patent describes a solid-state control circuit providing a fixed off-time delay. The Harter patent describes a provision for a 2-minute delay during the initial portion of the run cycle to provide enough time for lubrication, in addition to providing a fixed 5-minute off-time delay.

SUMMARY OF THE INVENTION

The Refrigeration System Energy Controller described herein effectively surmounts those difficulties previously encountered when attempting to control a refrigeration system under widely varying ambient temperature conditions.

To accomplish this, the Refrigeration System Energy Controller provides a solid-state switch to control application of electrical power to the refrigeration compressor motor. Control of the solid-state switch is further accomplished by cooperation of an internal solid-state timer with the electrical contacts of the pressure control switch that is sensing the suction pressure between the evaporator and compressor of the refrigeration unit. The pressure control switch contacts are applied to the Refrigeration System Energy Controller and are subject to the internal logic control imposed by the controller.

The following logic features serve to describe the characteristics and operation of the Refrigeration System Energy Controller:

(a) a timing period is initiated in the internal solid-state timer of the controller
  (1) whenever power is applied to the controller, and
  (2) whenever the compressor is stopped by the opening of the internal solid-state switch and subsequent interruption of electrical power to the compressor motor. Either condition shall be considered the initiation of a refrigeration timing cycle, although the first condition would normally occur only during start-up of the refrigeration system, while the latter condition will prevail during continuous operation. This timing period will be set to the minimum desired time of a refrigeration cycle, which includes consecutive compressor off and on-times.

(b) Whenever the cut-in suction pressure has been sensed by the pressure control switch and its contacts close, the internal solid-state switch of the Controller will also close, thus applying electrical power to and starting the compressor motor.

(c) As long as the contacts of the pressure control switch remain closed (suction pressure higher than the cut-out pressure), the compressor motor will stay energized. However, when the suction pressure has been reduced sufficiently to the cut-out level, and the contacts of the pressure control switch open, two conditions can prevail with regard to the compressor motor:
  (1) if the internal solid-state timer has previously completed its timing period, the internal solid-state switch will open, and the compressor motor will be halted;
  (2) if the internal solid-state timer is still in the process of completing its timing period, the internal solid-state switch will remain closed, maintaining compressor operation.

(d) As soon as the timing period of the internal solid-state timer is completed, and the contacts of the pressure control switch remain open (suction pressure is lower than the cut-out setting), the internal solid-state switch will open, interrupting power to and stopping the compressor motor.

The beneficial effects produced by the cooperation of the logic features of the Refrigeration System Energy Controller, its internal solid-state switch, solid-state timer and the pressure control switch may now be enumerated:

(a) The suction pressure in the line between evaporator and compressor will never be allowed to rise higher than the cut-in pressure setting on the pressure control switch. This assures that the temperature in the refrigeration unit will be maintained at or below some safe level.

(b) By setting a minimum time limit for a complete refrigeration cycle (equal to the timing period of the solid-state timer of the Controller), short-cycling of the compressor motor is prevented. Furthermore, to assure no excessive strain on the compressor motor, it will be inhibited from turning on until the low-side suction pressure reaches the cut-in level, assuring a safe compression ratio.

(c) A higher cut-out setting is possible on the pressure control switch. During colder weather, the refrigeration system is more efficient and the suction pressure may decrease below the cut-in setting before the compressor motor is turned off (due to the timing period not exhausted). However, the effect is beneficial, since the next refrigeration cycle will tend to be longer, a longer time being required for the suction pressure to reach cut-in. During hot weather, the refrigeration cycle will quite possibly be longer than the Controller timing period, because the compressor needs to work harder to reduce the pressure (and temperature). However, the on-time of the compressor motor will still be considerably less than that presently possible with refrigeration systems, since the range (cut-in minus cut-out pressure) of the pressure control switch may be adjusted to a minimum differential determined only by the desired average refrigerator temperature.

In summary, the Refrigeration System Energy Controller, acting in concert with a pressure control switch monitoring the suction line of a refrigeration system, is able to achieve the beneficial effects of constant average refrigerator temperature, short-cycle prevention, and energy savings during year-round, all-weather operation, by its unique configuration and logic features.

BRIEF DESCRIPTION OF THE DRAWINGS

The details of the invention are described in connection with the accompanying drawings in which.

BEST MODE FOR CARRYING OUT THE INVENTION

Figure 1:
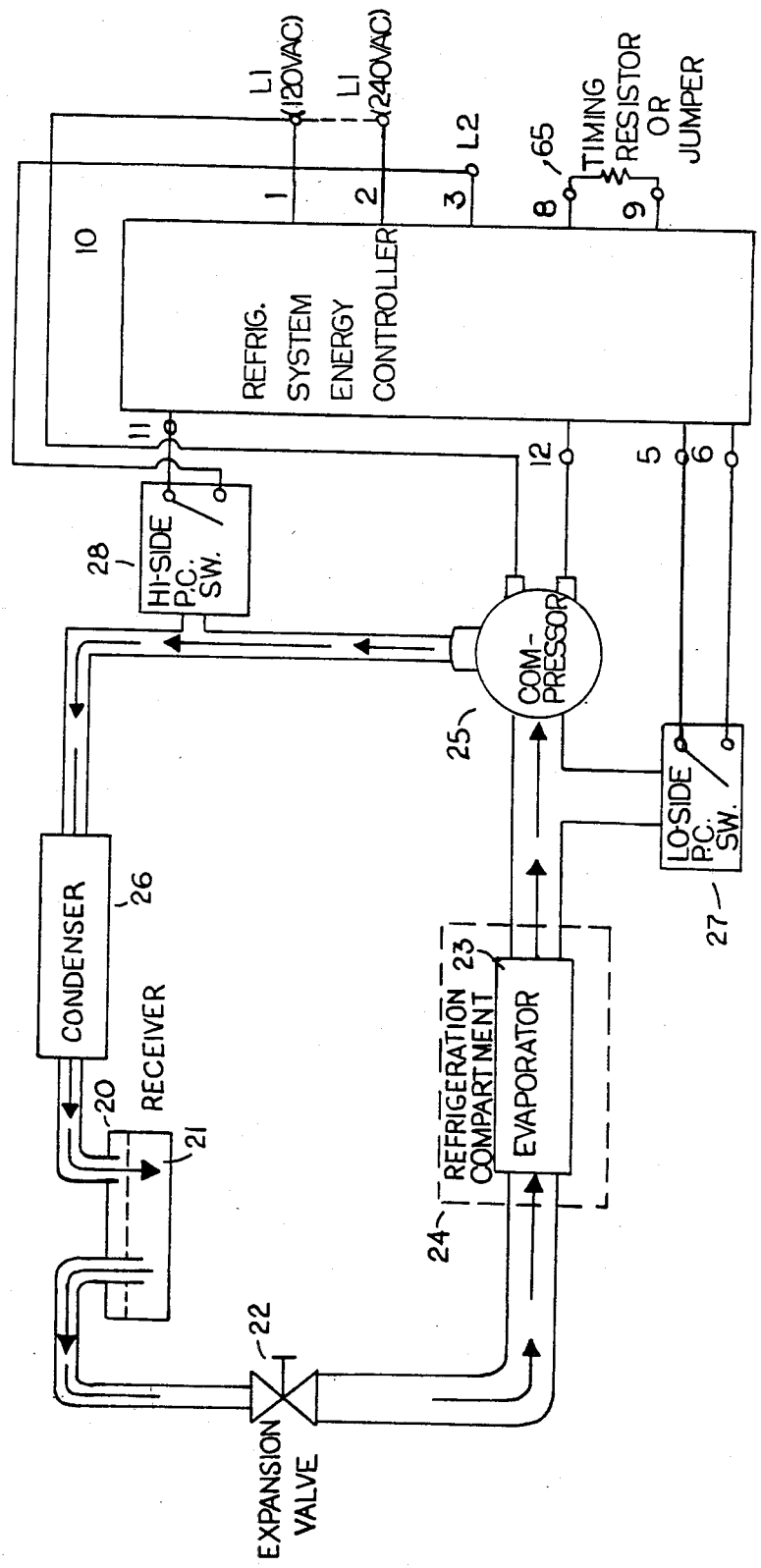
FIG. 1 is a system diagram illustrating the interconnection of the invention with a typical refrigeration system.
Figure 2:
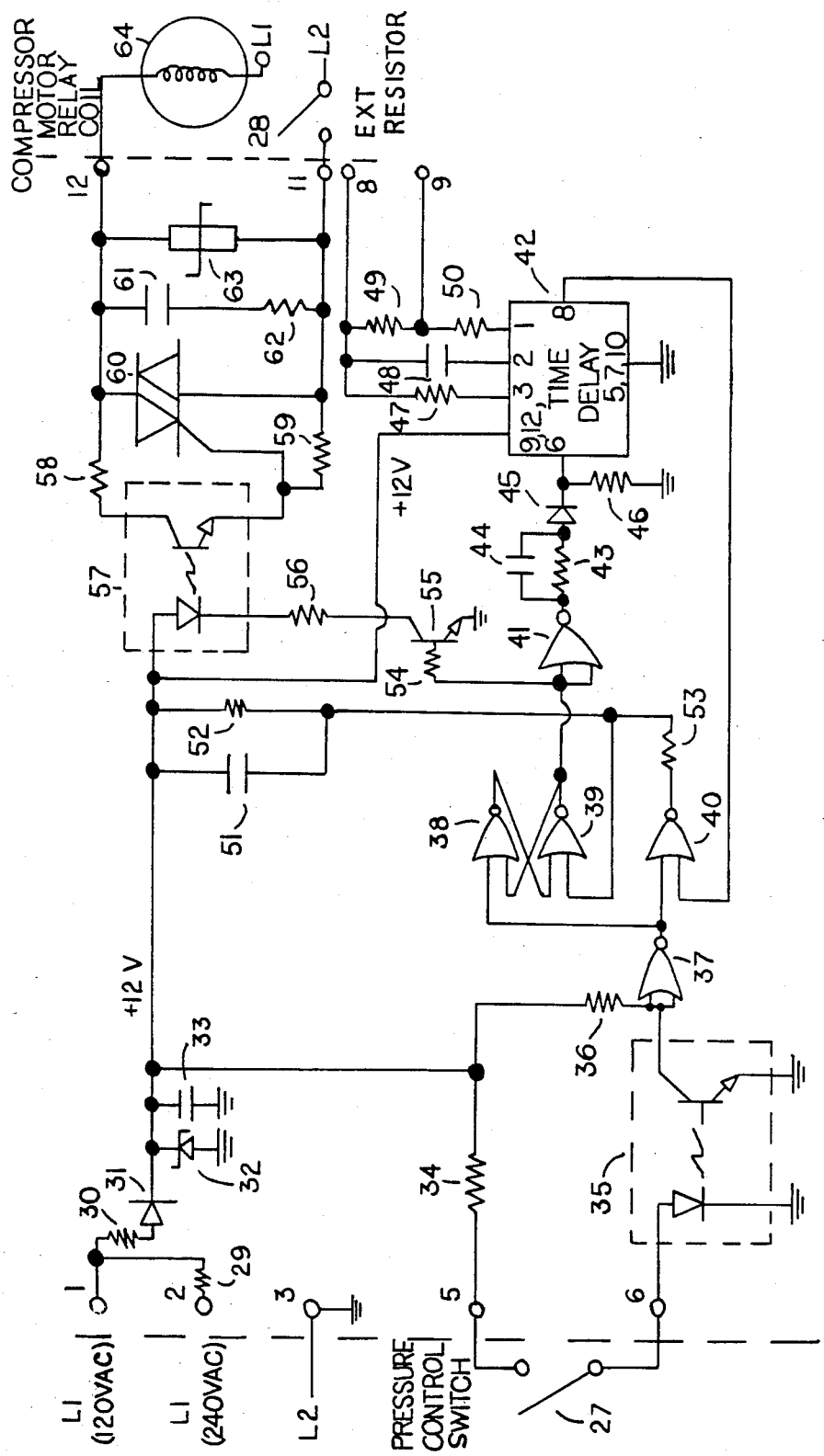
FIG. 2 is an electrical schematic of the invention also illustrating electrical interconnections to related components of the refrigeration system.
Figure 3:
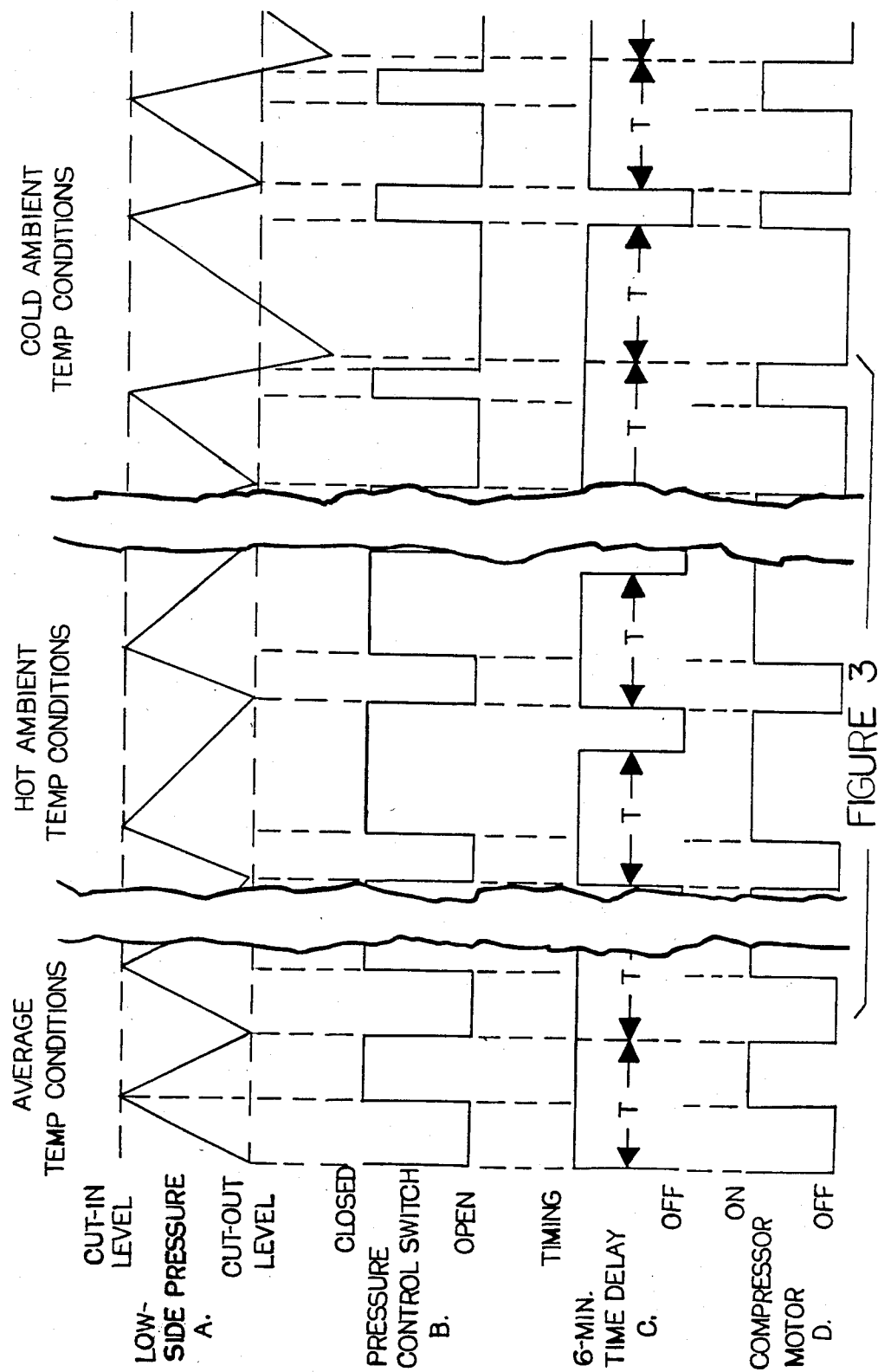
FIG. 3 illustrates timing waveforms at pertinent locations in a typical refrigeration system being controlled by the invention. Variations in these waveforms for different ambient temperature conditions in the vicinity of the refrigeration system are presented.

The refrigeration system energy controller 10 is described in terms of the best mode (preferred embodiment) of the invention and is depicted in FIGS. 1 through 3.

FIG. 1 illustrates the interconnection of the refrigeration system comprising a receiver 20 for holding the refrigerant 21. The refrigerant 21 leaves the receiver 20 under high pressure, is passed through an expansion valve 22, which reduces the pressure of the refrigerant 21. The refrigerant 21 is then evaporated and absorbs heat in an evaporator 23 located in a refrigeration compartment 24. A compressor 25 pumps the refrigerant 21 as a vapor and raises its pressure, discharging high pressure gas into an air-cooled condenser 26, where it loses the heat it gained in the evaporator 23, and condenses into a liquid at the high pressure. The liquid refrigerant flows back to the receiver 20 to continue its cycle.

In the low-pressure line between the evaporator 23 and compressor 25, a low-side pressure control switch 27 is typically connected. A pair of dry contacts are provided on the pressure control switch 27, which are electrically connected to a pair of terminals labeled 5 and 6 on the invention 10. These contacts will close, or short together, at a settable cut-in pressure, and will open again at a lower settable cut-out pressure.

In the high pressure line between the compressor 25 and the condesner 26, a high-side pressure control switch 28 is often connected. A pair of dry contacts are also provided on the pressure control switch 28. Whereas, typically the low-side pressure control switch 27 is used to control the average temperature in the refrigeration compartment 24 and to control the amount of electrical energy used to drive the compressor 25, the high-side pressure control switch 28 is normally used as a safety control to interrupt the compressor motor if the high-side pressure becomes too great. This is accomplished by connecting the contacts of pressure control switch 28 in series with one of the A-C voltage input terminals of compressor 25. Line L1 of the A-C input voltage is connected directly to one of the two compressor 25 motor terminals. Line L2 is connected indirectly to the other compressor 25 motor terminal through the high-side pressure control switch 28 switch contacts and also through terminals 11 and 12 of the invention 10. Control of the A-C conduction through terminals 11 and 12 will be described later in the description. A-C voltage is also supplied to the invention 10 between terminals 1 and 3, or if instead, 240 VAC is to be used, it is supplied between terminals 2 and 3 of the invention 10. Provisions are also made for controlling the time delay of the invention 10 by connecting a jumper or selectable resistor between terminals 8 and 9.

FIG. 2 presents a detailed schematic of the invention 10. A-C input voltage is supplied through either terminal 1 or 2 of the invention 10, depending on whether 120 VAC or 240 VAC is available. In the latter case, resistor 29 limits the input current to that value obtainable with 120 VAC. A rectifier-filter combination, consisting of resistor 30, rectifier diode 31, 12-volt zener diode 32 and capacitor 33 converts the AC input voltage to a regulated positive 12-volts DC, which is used as a supply voltage for the logic and time-delay circuitry of the invention 10.

When the contacts of pressure control switch 27 close, DC current is supplied through resistor 34 to an opto-electronic device 35. This device 35, which is typically a G.E. 4N25, provides optical isolation from the switch contacts to the logic and timing circuitry. The 4N25 is manufactured by the General Electric Company, United States of America. The output of opto-electronic device 35 is caused to be low (logical "0") when the pressure control switch 27 closes, and is normally high (logical "1") when the switch 27 is open. This signal is inverted in inverter 37 and distributed to one input of dual NOR-gate 38 and to one input of dual NOR-gate 40. NOR-gates 38, 39 and 40 provide logic to control initiation of an internal time-delay and the energization of the compressor 25. NOR-gates 38 and 39 are interconnected to form an R-S (reset-set) flip-flop. The output of NOR-gate 39 is considered the output of the flip-flop, and it is normally in the reset state (logical "0"). NOR-gate 40 serves as a reset gate for the flip-flop 38 and 39. The two inputs to NOR-gate 40 are inverter 37 output and timer circuit 42 output. Inverter 37 output is low (logical "0") when the pressure control switch 27 is open (low pressure). Timer 42 is low (logical "0") when it is not in its timing cycle. When this condition occurs (both inputs to NOR-gate 40 are low), the input to NOR-gate 39 will slowly go high (due to capacitor 51. and resistors 52 and 53) and flip-flop 39 output will go low, causing inverter 41 to go high. The output of inverter 41 is connected to a positive trigger network comprising resistor 43, capacitor 44, diode 45, and resistor 46. The positive-going trigger signal across resistor 46 initiates a time-delay in timer 42, causing its output to go high (logical "1"). The time-delay period is set by the R-C network consisting of resistor 47, capacitor 48, and resistors 49 and 50. With no external resistor across terminals 8 and 9 of the invention 10, the time-delay is nominally set to 9 minutes. By connecting a jumper across terminals 8 and 9, this time-delay will be reduced to 6 minutes. It will be obvious to one skilled in the art that the time-delay from timer 42 may be adjusted to any desired time (within limits specified by timer 42) by proper choice of components 47 through 50.

When the timing period from timer 42 expires, another timing period will be initiated, provided the pressure control switch 27 is open. Whenever the pressure control switch 27 closes due to low-side pressure climbing to cut-in, flip-flop output 39 will go high (logical "1") to the "set" condition. This, in turn, conducts current through resistor 54 to the base of NPN transistor 55, causing current to flow through the input of opto-electrical device 57 and resistor 56 to the collector of transistor 55. Transistor 55 is a GES-6014, 800 ma, 60 VDC silicon transistor manufactured by General Electric Company, United States of America. Conduction of current through the input of opto-electrical device 57 causes current to flow in the isolated output circuit of device 57, which is a 230 VAC opto-coupler (Theta-J Corporation, part no. TOC-5002). Opto-coupler 57 isolates the AC load circuit from the DC-powered timing and logic circuitry. The output current flowing through opto-coupler 57 is supplied by the AC input voltage L1 being applied to compressor 25 motor load in series with resistors 58 and 59, and high-side pressure control switch 28 dry contacts, and returning to the AC return line L2. Triac 60 is connected in parallel across the series combination of resistor 58, opto-coupler 57 output transistor, and resistor 59. The conduction of opto-coupler 57 causes sufficient gate current to flow in triac 60, causing it to effectively short-circuit terminals 11 and 12 of the invention 10, and thereby to energize compressor 25, provided high-side pressure control switch 28 is closed. Overload protection is provided for opto-coupler 57 and triac 60 by metal-oxide varistor 63, which is an 8 joule varistor supplied by Mepco-Electra (part no. V94-14712). A series combination of capacitor 61 and resistor 62 provides a shunt path for higher frequency interference that may appear on the AC input voltage line.

De-energization of the compressor 25 motor will occur when NOR-gate 39 again goes low. This occurs only when the low-side pressure control switch 27 opens and the timer 42 has completed its timing cycle. As previously described, this is also coincident with the initiation of another timing cycle.

Summarizing the logic features of the invention: A timing cycle will be initiated when power is first applied to the invention 10, provided the low-side pressure control switch 27 is open. Closure of the pressure control switch 27 will energize the external load 25, provided the high-side pressure control switch 28 is closed. Load 25 will de-energize in one of three ways:

(a) when the pressure control switch 27 is opened before the end of the timing period, load 25 will de-energize at the end of the cycle.

(b) When the pressure control switch 27 remains closed beyond the end of the timing period, the load 25 will de-energize when the switch opens.

(c) When the high-side pressure exceeds a safe limit and causes the high-side pressure control switch 28 to open, the load 25 will de-energize. Further timing cycles are initiated when the load 25 de-energizes.

FIG. 3 illustrates conditions in a typical refrigeration system that is being controlled by the invention 10. Three different ambient temperature conditions have been illustrated: cold, average, and hot temperatures in the vicinity of the refrigeration compartment. Four different waveforms are shown for each of the conditions:

(a) time variation of the low-side pressure, also showing cut-in and cut-out levels of the pressure control switch 27, (b) corresponding low-side pressure control switch 27 states, (c) corresponding state of timer 42 in the invention 10, (d) corresponding state of the compressor motor 25.

The average pressure in waveform (a) is a measure also of the average temperature of the refrigeration compartment. It is seen that the average pressure is maintained between cut-in and cut-out levels during all ambient conditions.

Wavefore (b) illustrates the condition of the low-pressure control switch 27 contacts. These change state when pressure climbs to cut-in level or drops to cut-out level.

The timer waveform of figure (c) illustrates that in some cases the timer begins another cycle immediately after completing its normal time delay. This occurs if the low-side pressure is equal to or lower than the cut-out level at the end of the normal time delay. This will generally occur in cooler temperatures when the compressor quickly lowers the pressure to or below cut-out before the timer 42 delay has elapsed.

The compressor motor 25 waveform (d) illustrates how the duty cycle changes as the ambient conditions change. Note that short-cycling of the compressor motor 25 is prevented because the timer 42 forces a compressor off-on cycle period of no less than the timer 42 time-delay. Also, since the compressor always starts at the time that the low-side pressure reaches cut-in, the low-side pressure is prevented from exceeding the cut-in pressure.

Figure 4:
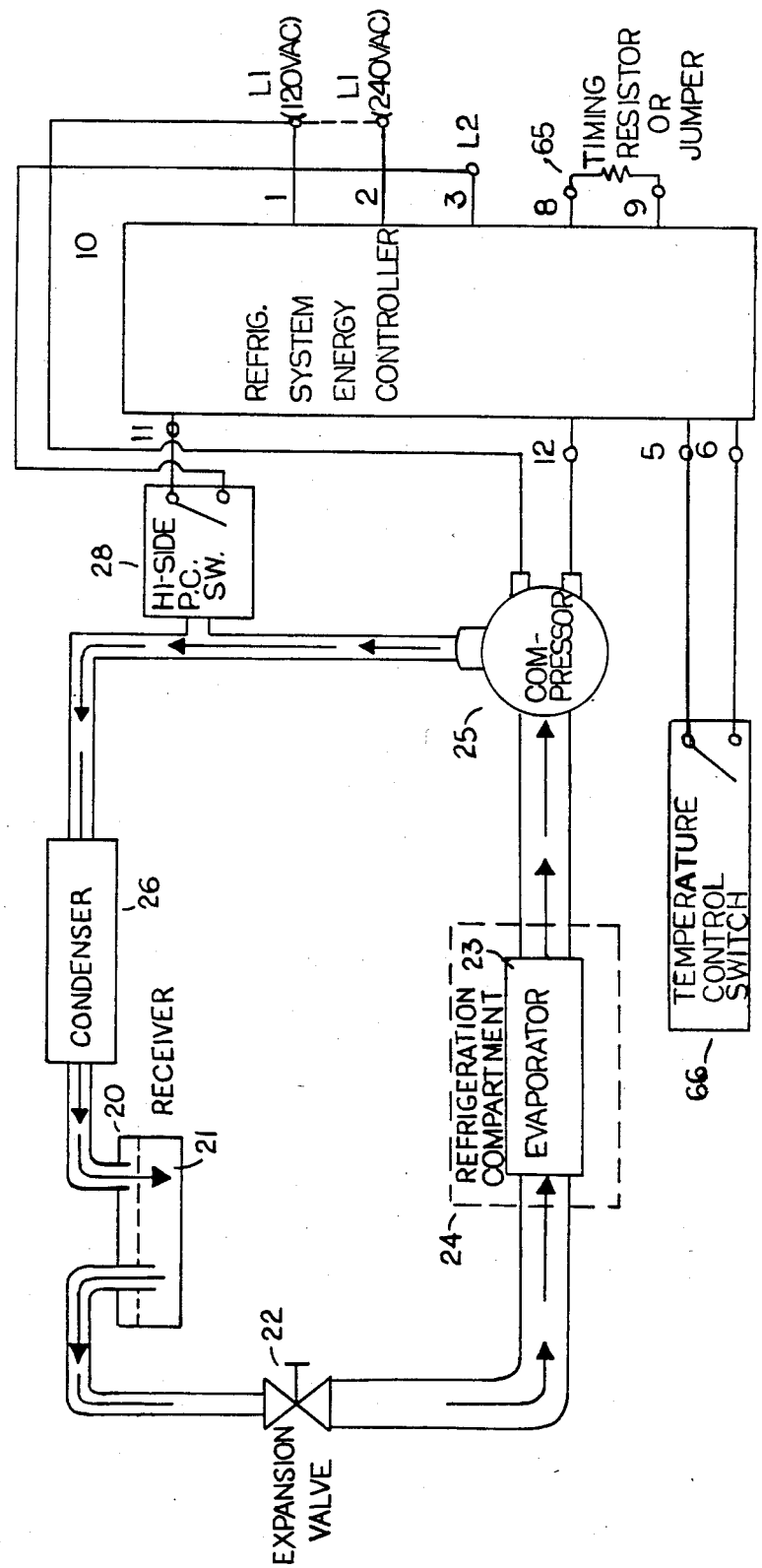
FIG. 4 is an alternative system diagram, where a temperature control switch is used instead of a pressure control switch.

FIG. 4 illustrates an alternative system diagram wherein the invention 10 operates in an almost identical manner to the system operation of FIG. 1. The temperature control switch 66 is situated in the refrigeration compartment 24 and has an adjustable range, a temperature sensing means, and a pair of dry contacts electrically connected to terminals 5 and 6 on the invention 10. These contacts will close at a settable cut-in temperature, and will open again at a lower settable cut-out temperature. Since the temperature in the compartment 24 will maintain a proportionality to the pressure in the low-pressure line between the evaporator 23 and compressor 25, all of the features and advantages of the invention 10 previously described in the context of the system of FIG. 1 will also apply to the system of FIG. 4. For example, the operation of opto-electronic device 35 serves as a pressure-voltage converter in the system of FIG. 1, and as a temperature-voltage converter in the system of FIG. 4.

I claim:

1. A refrigeration system energy controller for controlling the on-off cycle time of a refrigeration compressor motor, comprising:

(a) a pressure-voltage converter that accepts an input from a pressure-sensing means, the converter producing a first electrical voltage when the pressure sensed by the pressure-sensing means is greater than a high pressure threshold, and producing a second electrical voltage when the pressure sensed by the pressure-sensing means is lower than the low pressure threshold;

(b) a logic timer that produces a timing signal for a fixed time duration, the timer initiating the timing signal when the second electrical voltage is present and the timing signal is absent; and (c) a logic switch that produces a two-valued electrical resistance path for completion of a compressor motor energization circuit, the value of the electrical resistance path being sufficiently low to assure energization of the motor when the first electrical voltage is present, and the value of the electrical resistance path being sufficiently high to prevent energization of the motor when the second electrical voltage is present and the timing signal is absent.

2. The apparatus as recited in claim 1, wherein the pressure-sensing means is a pressure control switch located in the low pressure suction line of a refrigeration system, the pressure control switch providing a pair of dry electrical contacts to the pressure-voltage converter.

3. The apparatus as recited in claim 2, wherein the refrigeration system energy controller is packaged integrally with the pressure control switch.

4. A refrigeration system energy controller for controlling the on-off cycle time of a refrigeration compressor motor, comprising:

(a) a temperature-voltage converter that accepts an input from a temperature-sensing means, the converter producing a first electrical voltage when the temperature sensed by the temperature-sensing means is greater than a high temperature threshold, and producing a second electrical voltage when the temperautre sensed by the temperature-sensing means is lower than the low temperature threshold;

(b) a logic timer that produces a timing signal for a fixed time duration, the timer initiating the timing signal when the second electrical voltage is present and the timing signal is absent; and (c) a logic switch that produces a two-valued electrical resistance path for completion of a compressor motor energization circuit, the value of the electrical resistance path being sufficiently low to assure energization of the motor when the first electrical voltage is present, and the value of the electrical resistance path being sufficiently high to present energization of the motor when the second electrical voltage is present and the timing signal is absent.

5. The apparatus as recited in claim 1 or 4, wherein the logic switch is connected in series with a relay holding coil, the coil producing energization of the refrigeration compressor motor when the low resistance path through the logic switch is present, and producing de-energization of the motor when the high resistance path is present.

6. The apparatus as recited in claim 5, wherein the logic switch is further connected in series with an external switching device, therein requiring both the low resistance path through the logic switch and a second low resistance path through the external switching device to be present to insure energization of the refrigeration compressor motor.

7. The apparatus as recited in claim 1 or 4 wherein the refrigeration system energy controller is packaged integrally with the refrigeration compressor motor.

8. The apparatus as recited in claim 4, wherein the temperature-sensing means is located in the refrigeration compartment of the refrigeration system, 9. The apparatus as recited in claim 1 or 4, wherein the time duration of the timing signal may be adjusted in accord with different environmental and operational conditions.

* * * * *